United States Patent

Nakamura et al.

[11] Patent Number: 5,904,887
[45] Date of Patent: May 18, 1999

[54] MOLDING METHOD OF COMPOSITE

[75] Inventors: Akito Nakamura; Yasumichi Shigehisa, both of Chiba Prefecture, Japan

[73] Assignee: Dow Corning Toray Silicone Co., Ltd., Tokyo, Japan

[21] Appl. No.: 08/531,263

[22] Filed: Sep. 20, 1995

[30] Foreign Application Priority Data

Sep. 29, 1994 [JP] Japan .................................... 6-259498

[51] Int. Cl.⁶ .................................................. B29C 33/40
[52] U.S. Cl. ...................................... 264/255; 264/331.11
[58] Field of Search ................................ 264/255, 331.11

[56] References Cited

U.S. PATENT DOCUMENTS

| | | | |
|---|---|---|---|
| 4,555,529 | 11/1985 | Lee et al. | 521/124 |
| 5,064,924 | 11/1991 | Shimizu et al. | 528/15 |
| 5,256,480 | 10/1993 | Inoue et al. | 428/331 |

FOREIGN PATENT DOCUMENTS

| | | |
|---|---|---|
| 1291609 | 5/1987 | Canada . |
| 207611 | 9/1987 | Japan . |
| 5-5063 | 1/1993 | Japan . |

Primary Examiner—Catherine Timm
Assistant Examiner—Suzanne E. Mason
Attorney, Agent, or Firm—William F. Boley

[57] ABSTRACT

A manufacturing method for making a composite comprising silicone rubber and a thermoplastic resin in high precision and in high productivity. In the method, a thermoplastic resin is injected into the cavity of a mold. Then, a liquid silicone rubber composition which comprises (A) organopolysiloxane, (B) spherical fine particle catalyst consisting of platinum base catalyst-containing thermoplastic resin, (C) organohydrogenpolysiloxane, and (D) hydrosilylation reaction inhibiting compound, is injected into the same mold and cured.

11 Claims, 1 Drawing Sheet

MOLDING METHOD OF COMPOSITE

BACKGROUND OF INVENTION

The present invention is a molding method for a composite consisting of silicone rubber and a thermoplastic resin.

A previously known molding method for composites consisting of silicone rubber and a thermoplastic resin is one in which the thermoplastic resin molding is injection-molded in advance and unvulcanized silicone rubber is put in the cavity of the same mold and pressure molded (monocomponent molding method). Another previously known method is one where the thermoplastic resin is injected and successively unvulcanized silicone rubber is injected into the cavity of the same mold and molded (multicomponent molding method).

However, there have been problems in the monocomponent molding method in that the thermoplastic resin molding tends to deform by heating, is difficult to obtain a high precision composite, and productivity of the method is extremely low. In the multicomponent molding method, which overcomes these problems, a silicone rubber composition, which cures quickly below the softening point of the thermoplastic resin is required. Such a quick curing silicone rubber composition has previously been achieved by adding a large amount of platinum base catalyst or by adjusting the kind or the amount of addition of the hydrosilylation reaction inhibiting compound. Such quick curing silicone rubber compositions are disclosed, for example, in JP (Kokai) 62-207611, and JP (Kokai) 62-264920.

However, the liquid silicone rubber compositions disclosed in JP (Kokai) 62-207611 and JP (Kokai) 62-264920 have a fault in that they have poor storage stability and their curing proceeds in the mixer during molding forming gels. This requires that the mixer section be cooled to below 5° C., which is a cost disadvantage. An addition problem associated with cooling of the mixer section is moisture condensation around the mixer, which can also effect productivity.

The objective of the present invention is to present a method for manufacturing composites of silicone rubber and a thermoplastic resin in high precision and in high productivity.

SUMMARY OF INVENTION

A manufacturing method for making a composite comprising silicone rubber and a thermoplastic resin in high precision and in high productivity. In the method, a thermoplastic resin is injected into the cavity of a mold. Then, a liquid silicone rubber composition which comprises (A) organopolysiloxane, (B) spherical fine particle catalyst consisting of platinum base catalyst-containing thermoplastic resin, (C) organohydrogenpolysiloxane, and (D) hydrosilylation reaction inhibiting compound, is injected into the same mold and cured.

Figure 1:
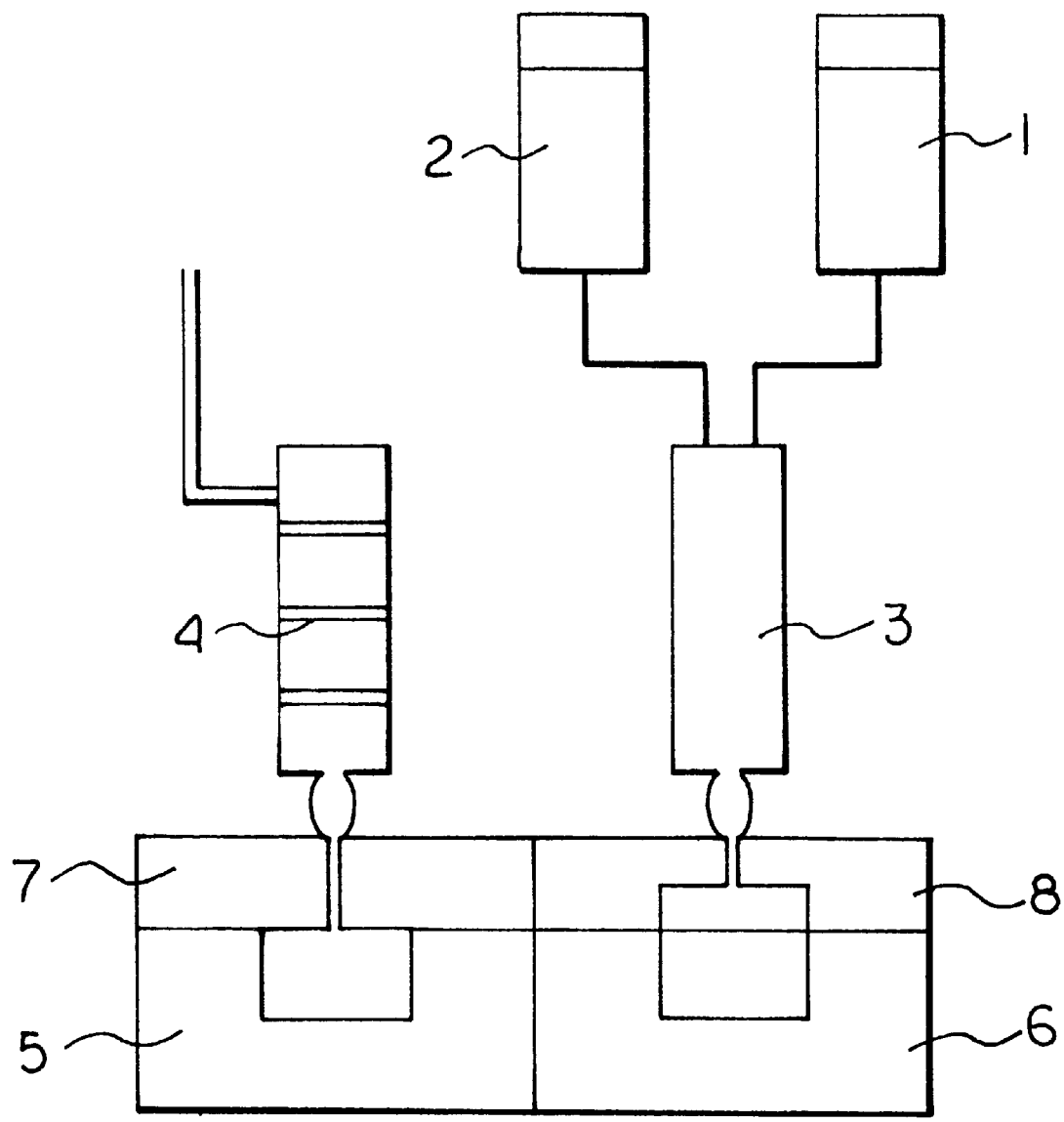
FIG. 1 shows an apparatus used in the molding method for the composite of the present invention. Explanation of symbols.

1 Tank for liquid silicone rubber
2 Tank for liquid silicone rubber
3 Static mixer
4 Thermoplastic resin injection molding machine
5 Primary bottom mobile mold
6 Secondary bottom mobile mold
7 Primary top stationary mold
8 Secondary top stationary mold

DESCRIPTION OF INVENTION

The present invention is a molding method for a composite in which a thermoplastic resin and a liquid silicone rubber composition are injected consecutively into the cavity of a single mold or the cavity formed by two or more molds. In the molding method the thermoplastic resin undergoes the primary injection followed by the secondary injection of the liquid silicone rubber composition. The liquid silicone rubber composition is cured at a temperature higher than 50° C. and lower than the softening point of the aforesaid thermoplastic resin. The liquid silicone rubber composition comprises (A) 100 parts by weight of an organopolysiloxane described by average unit formula $R^1_a R^2_b SiO_{(4-a-b)/2}$, where $R^1$ is a monovalent hydrocarbon group which does not contain aliphatic unsaturated linkage, $R^2$ is an alkenyl group, a is a number of 1.90 to about 2.05, b is a number of 0.0005 to about 0.1, and a+b is a number of 1.91 to about 2.06, (B) 1 to about 1,000 parts by weight platinum metal per one million parts of the (A) constituent where the platinum metal is added as a spherical fine particle catalyst comprising a thermoplastic resin having a softening point temperature of 50 to about 150° C. and an average particle size of 0.01 to about 10 $\mu$m and a platinum base catalyst providing 0.01 weight percent or greater platinum metal on an elemental basis, (C) an organohydrogenpolysiloxane containing at least 3 hydrogen atoms bonded to silicon atoms in a molecule and the amount of the (C) constituent is such that the ratio of the number of moles of hydrogen atoms bonded to silicon atoms in the (C) constituent and the number of moles of alkenyl groups bonded to silicon atoms in the (A) constituent is 0.5/1 to about 20/1, and (D) 0.005 to about 10 parts by weight of a hydrosilylation reaction-inhibiting compound.

The present invention is explained in detail in the following. The thermoplastic resin used in the present invention can be any thermoplastic resin which can be injection-molded, and there is no particular limitation for its kind. The thermoplastic resin can be, for example, nylon-6, nylon-66, polystyrene, styrene-butadiene copolymer, ABS, polycarbonate, poly(methyl methacrylate), or poly(vinyl chloride).

The liquid silicone rubber composition used in the present invention is a liquid silicone rubber composition comprising (A) 100 parts by weight of an organopolysiloxane described by average unit formula $R^1_a R^2_b SiO_{(4-a-b)/2}$, where $R^1$ is a monovalent hydrocarbon group which does not contain aliphatic unsaturated linkage, $R^2$ is an alkenyl group, a is a number of 1.90 to about 2.05, b is a number of 0.0005 to about 0.1, and a+b is a number of 1.91 to about 2.06, (B) 1 to about 1,000 parts by weight platinum metal per one million parts of the (A) constituent where the platinum metal is added as a spherical fine particle catalyst comprising a thermoplastic resin having a softening point temperature of 50 to about 150° C. and an average particle size of 0.01 to about 10 $\mu$m and a platinum base catalyst providing 0.01 weight percent or greater platinum metal on an elemental basis, (C) an organohydrogenpolysiloxane containing at least 3 hydrogen atoms bonded to silicon atoms in a molecule and the amount of the (C) constituent is such that the ratio of the number of moles of hydrogen atoms bonded to silicon atoms in the (C) constituent and the number of moles of alkenyl groups bonded to silicon atoms in the (A) constituent is 0.5/1 to about 20/1, and (D) 0.005 to about 10 parts by weight of a hydrosilylation reaction-inhibiting compound.

The (A) constituent, organopolysiloxane, is the principal constituent of the liquid silicone rubber composition used in the present invention. In the aforesaid formula describing the (A) constituent, $R^1$ is a monovalent hydrocarbon group which does not contain aliphatic unsaturated linkage, for example, an alkyl group such as methyl, ethyl, propyl, butyl, and octyl; an aryl group such as phenyl and tolyl; or a substituted alkyl group such as chloromethyl and 3,3,3-trifluoropropyl. In the formula, $R^2$ is an alkenyl group, for example, vinyl, allyl, or hexenyl. In the formula, a is a number of 1.90 to about 2.05, expressing the number of monovalent hydrocarbon groups which do not contain aliphatic unsaturated linkage and b is a number of 0.0005 to about 0.1, expressing the number of alkenyl groups. In the formula, a+b is a number of 1.91 to about 2.06.

The molecular structure of the (A) constituent should preferably be straight chain, but the presence of a small amount of branched chain can be allowed. The alkenyl groups in the (A) constituent can be either terminal on the molecular chain or pendant on the molecular chain, or both. Preferred is when the alkenyl groups of the (A) constituent are on the terminals of the molecular chain, since the mechanical characteristics of the silicone rubber after curing are superior in this case. Although there is no particular limitation for the viscosity of the (A) constituent, it is preferable that the viscosity be in the range of 10 to about 1,000,000 centipoise at 25° C. The (A) constituent can be, for example, dimethylvinylsiloxy-capped dimethylpolysiloxane, trimethylsiloxy-capped dimethylsiloxane-methylvinylsiloxane copolymer, dimethylvinylsiloxy-capped dimethylsiloxane-methylvinylsiloxane copolymer, dimethylvinylsiloxy-capped dimethylsiloxane-methylphenylsiloxane copolymer, and dimethylvinylsiloxy-capped dimethylsiloxane-methyl (3,3,3-trifluoropropyl)siloxane copolymer.

The (B) constituent is the constituent which distinguishes the liquid silicone rubber used in the present invention, and it is the hydrosilylation reaction catalyst for the addition reaction between the alkenyl groups bonded to silicon atoms in the (A) constituent and hydrogen atoms bonded to silicon atoms in the (C) constituent. The (B) constituent comprises a thermoplastic resin which contains a platinum base catalyst at a concentration providing 0.01 weight percent or higher platinum metal on an element basis. The platinum base catalyst in the (B) constituent can be, for example, platinum fine powder, chloroplatinic acid, alcohol-modified chloroplatinic acid, a complex of platinum and diketone, a complex of chloroplatinic acid and an olefin, a complex of chloroplatinic acid and an alkenylsiloxane, and also these compounds supported on, for example, alumina, silica, and carbon black. A complex of chloroplatinic acid and an alkenylsiloxane is preferred, since its activity as a hydrosilylation reaction catalyst is high. More preferred is a platinum alkenylsiloxane complex as disclosed in JP 42-22924.

The softening point of the thermoplastic resin comprising the (B) constituent is required to be in a temperature range of 50 to about 150° C. If the softening point is lower than 50° C., the storage stability of the liquid silicone rubber composition at room temperature is degraded drastically. If the softening point temperature exceeds 150° C., the temperature to activate the catalyst becomes too high and the curing temperature of the liquid silicone rubber composition obtained becomes unacceptably high. The thermoplastic resin can be, for example, thermoplastic silicone resin, thermoplastic acrylic resin, thermoplastic polysilane resin, thermoplastic polystyrene resin, and thermoplastic methylcellulose resin. When a thermoplastic silicone resin is used as the (B) constituent, although there is no particular limitation for its molecular structure or chemical structure, it must be insoluble in the (A) constituent of the liquid silicone rubber composition. Also, it is necessary to appropriately select the (B) constituent to be used such that its softening point temperature is lower than the softening point temperature of the plastic which is molded into the composite.

The average particle size of the spherical fine particle catalyst of the (B) constituent is in the range of 0.01 to about 10 $\mu$m. This is because it is difficult to produce spherical fine particle catalyst of an average particle size less than 0.01 $\mu$m. If the particle size exceeds 10 $\mu$m, the catalytic activity of the spherical fine particle catalyst is reduced and the spherical fine particle catalyst tends to separate from the liquid silicone rubber composition.

The amount of addition of the (B) constituent is in the range of 1 to about 1000 parts by weight as platinum metal per 1 million parts by weight of organopolysiloxane of the (A) constituent, and preferably in the range of 1 to about 100 parts by weight. If platinum metal of the (B) constituent is less than 1 parts by weight per 1 million parts by weight of organopolysiloxane of the (A) constituent, the liquid silicone rubber composition obtained cannot be cured sufficiently. If the platinum metal of the (B) constituent exceeds 100 parts by weight, it is uneconomical.

The (C) constituent is a crosslinking agent and is an organohydrogenpolysiloxane which contains at least 3 hydrogen atoms bonded to silicon atoms in a molecule. Other than the hydrogen atoms bonded to silicon atoms, the organic groups bonded to silicon atoms in the (C) constituent can be alkyl groups such as methyl, ethyl, and propyl; aryl groups such as phenyl and tolyl; and substituted alkyl groups such as chloromethyl, 3-chloropropyl, and 3,3,3-trifluoropropyl group.

There is no particular limitation on the molecular structure of the (C) constituent, and it can be straight chain, straight chain with branches, cyclic, or network structure. The viscosity of the (C) constituent is preferably in the range of 3 to about 10,000 centipoise at 25° C. The amount of addition of the (C) constituent is that providing a ratio of number of moles of hydrogen atoms bonded to silicon atoms in the (C) constituent to the number of moles of alkenyl groups bonded to silicon atoms in the (A) constituent of 0.5/1 to about 20/1 and preferably 1/1 to about 3/1. If the number of moles of hydrogen atoms bonded to silicon atoms is less than 0.5 per mole of alkenyl group, the composition obtained does not cure sufficiently. If the ratio of moles of hydrogen atoms bonded to silicon to moles of alkenyl group exceeds 20 the silicone rubber may foam.

The (D) constituent inhibits the heat curing of the liquid silicone rubber composition used in the present invention. This substance is a hydrosilylation reaction inhibiting compound which has the effect of delaying curing and improving the storage stability of the liquid silicone rubber composition. Previously known hydrosilylation reaction inhibiting compounds can be used as the (D) constituent, for example, phosphorus containing compounds such as triphenylphosphine, nitrogen containing compounds such as tributylamine, tetramethylethylenediamine, and benzotriazole, sulfur containing compounds, acetylene based compounds, enyne compounds, hydroperoxy compounds, and maleic acid derivatives. The preferred inhibitors are hydrosilylation reaction inhibiting compounds selected from a group of compounds which contain at least one alkynyl group in a molecule, organosilicon compounds which contain alkynyl groups and alcoholic hydroxyl groups in a molecule, and organosilicon compounds in which alkenyl groups are bonded to at least two silicon atoms bonded to each other through an oxygen atom. For example, the inhibitor can be 2-methyl-3-butyn-2-ol, 2-phenyl-3-butyn-2-ol, 1-ethynyl-1-cyclohexanol, 3-methyl-1-hexyn-3-ol, 1,5-hexadiyne, 1,6-heptadiyne, 1,3-divinyltetramethyldisiloxane, 1,3,5,7-tetravinyltetramethylcyclotetrasiloxane, and 1,3-divinyl-1,3-diphenyldimethyldisiloxane.

Preferably, the (D) constituent has a boiling point higher than 80° C. at ambient pressure and its solubility in the (A) constituent is high. If the boiling point at ambient pressure is lower than 80° C., the inhibiting compounds tends to evaporate from the composition of the present invention. If the solubility of the inhibiting compound in the (A) constituent is low the inhibiting effect of the (D) constituent on released platinum catalyst base is reduced during the heat curing process.

The amount of addition of the (D) constituent is that providing about 0.005 to about 10 parts by weight per 100 parts by weight of the (A) constituent. If less than 0.005 part by weight is added, the storage stability of the obtained liquid silicone rubber composition is degraded. If the amount of inhibitor exceeds 10 parts by weight, curability of the obtained liquid silicone rubber composition at temperatures below the softening point of the thermoplastic resin is degraded.

Although the liquid silicone rubber composition used in the present invention consists of the aforesaid (A) constituent through (D) constituent, added to this can be, as needed, reinforcing filler such as fumed silica, wet method silica, silica aerogel, and fumed silica of which the surface has been hydrophobicized. Other optional constituents that can be added to the liquid silicone rubber composition include, for example, heat resisting agents such as iron oxide and rare earth compounds, flame retardants such as manganese carbonate and fumed titanium dioxide, extending fillers such as quartz powder, diatomaceous earth, calcium carbonate, and carbon black, and pigments.

The liquid silicone rubber composition used in the present invention is obtained by uniformly mixing the aforesaid (A) constituent through (D) constituent. There is no particular limitation in the method or order of their mixing. In order to improve the storage stability of the liquid silicon rubber composition in the vicinity of room temperature, and also in order to obtain excellent curability when applied to the multicomponent molding method after storage, it is preferable to store the liquid silicone rubber composition as a two-part system. In the two-part system, a part 1 comprises a portion of the (A) constituent and the (B) constituent, and a part 2 comprises the other portion of the (A) constituent, the (C) constituent, and the (D) constituent.

In the molding method of the present invention, there is no need to have cooling equipment such as a chiller in order to obtain extended storage stability in the mixer. It is possible to obtain sufficiently long storage stability by cooling of the mixer section just to the vicinity of room temperature.

In the present invention, the curing temperature of the liquid silicone rubber composition, which undergoes the secondary injection, is required to be above the softening point of the thermoplastic resin comprising the spherical fine particle catalyst and below the softening point of the thermoplastic resin which undergoes the primary injection. If the curing temperature of the silicone rubber composition is below the softening point temperature of the thermoplastic resin of the platinum base catalyst, the curing rate of the liquid silicone rubber composition is decreased and the productivity is drastically degraded. If the curing temperature of the liquid silicon rubber composition exceeds the softening point of the primary injected thermoplastic resin, a composite of high precision cannot be obtained.

The molding method of the present invention requires at least 2 injection processes per 1 composite, but it can have 3 or more injection processes. In this case, "primary injection" and "secondary injection" indicate the order of two consecutive injection processes.

The molds used in the molding method of the present invention can be those previously known. The mold can be split into a top and bottom or a left and right component. The mold can consist of single or plural components which can form a cavity when they are mutually fitted tightly together.

In the molding method of the present invention, the primary injection of the thermoplastic resin into the cavity of a single mold can be followed by the secondary injection of the liquid silicone rubber composition. Alternatively, after the primary injection of the thermoplastic resin into the cavity of a mold the mold can be opened and tightly fitted with another mold having a concave molding segment and the secondary injection of the liquid silicone rubber composition may be carried out into the cavity formed in extension to the cavity of the primary injection.

In the present invention, primer may be used in order to improve the adhesion of the thermoplastic resin and the liquid silicone rubber composition. When the primer is used, the mold is opened after the primary injection of the thermoplastic resin, and the primer coated or sprayed on the surface of the thermoplastic resin molding, followed by the secondary injection of the liquid silicone rubber composition, which is then cured. The appropriate primer for this application is the primer, of which the principal constituent is titanate ester, and the primer of which the principal constituent is silane coupling agent.

The method of the present invention can be easily practiced by combination of a known liquid silicone rubber injection molding machine and a known thermoplastic resin molding machine, and molds.

According to the present invention, the composite of liquid silicone rubber and thermoplastic resin, which was previously almost unobtainable, can be manufactured in high precision and in high productivity.

In the following, the present invention is explained by Examples. In the Examples the viscosity is the value at 25° C. In the molding method of the composite in Example 1 and Example 2, the apparatus shown in FIG. 1 was used.

Reference Example 1

A platinum vinylsiloxane complex was prepared. Six grams of an aqueous solution of chloroplatinic acid aqueous (platinum metal content 33 weight %) and 16 g of 1,3-divinyltetramethyldisiloxane were dissolved in 35 g of isopropyl alcohol. Ten grams of sodium hydrogencarbonate was added to this solution and reacted for 30 minutes at 70 to about 80° C. while stirring in suspension. Isopropyl alcohol and water were evaporation from the suspension at a pressure of 50 mmHg and a temperature of 45° C. The solid component was filtered and a 1,3-divinyltetramethyldisiloxane platinum vinylsiloxane complex recovered, of which the platinum content was 9.8 weight percent.

Reference Example 2

Preparation of thermoplastic silicone resin spherical fine particle catalyst. A solution was prepared by diluting 332 g of phenyltrichlorosilane, 53 g of dimethyldichlorosilane, and 110 g of diphenyldichlorosilane in 150 g of toluene. This solution was dropped into a liquid mixture consisting of 430 g of toluene, 142 g of methylethylketone, and 114 g of water for hydrolysis. This reaction mixture was washed with water to remove hydrogen chloride and the organic layer separated. Methylethylketone was removed by heating. Subsequently, 0.2 g of potassium hydroxide was added and the resulting mixture heated. The generated water was removed by evaporation, the resulting siloxane mixture was neutralized with acetic acid and washed with repeated water rinses. The siloxane mixture was dried to obtain a thermoplastic silicone resin. The glass transition point temperature of this thermoplastic silicone resin was 65° C., and the softening point temperature was 85° C.

Then, 900 g of the thermoplastic silicone resin, 500 g of toluene, and 4,600 g of dichloromethane were loaded into a glass vessel containing a stirrer and mixed uniformly. 44.4 g of platinum vinylsiloxane complex composition prepared in Reference example 1 was added and mixed to prepare an uniform solution of platinum vinylsiloxane complex and thermoplastic silicone resin. This solution was continuously sprayed into a spray-dryer chamber using a fluid nozzle, with hot nitrogen gas as the carrier gas. The temperature of hot nitrogen gas was 95° C. at the inlet of the spray-dryer chamber and 45° C. at the outlet, and the flow rate was 1.3 m$^3$/min. After 1 hour of operation, 450 g of a thermoplastic silicone resin fine particle catalyst containing platinum vinylsiloxane complex had been captured by means of a bag filter. The average particle size of this fine particle catalyst was 1.1 μm, and the content of the fine particle catalyst of 5 μm or larger particle size was 0.5 weight %. Scanning electron microscope observation of the fine particle catalyst confirmed that it was spherical in shape. The platinum base catalyst contained in the fine particle catalyst was about 0.4 weight % as platinum metal.

Reference Example 3

Preparation of thermoplastic acrylic resin spherical fine particle catalyst. A thermoplastic acrylic resin fine particle catalyst was prepared by the same procedure as described in Reference example 2 except that a methylmethacrylate-butylmethacrylate copolymer with a glass transition point temperature of 80° C. and a softening point temperature of 115° C. (product of DuPont Co., Elvacite 2013) was used instead of the thermoplastic silicone resin as described in Reference example 2. The average particle size of this fine particle catalyst was 2.5 μm, and the content of the fine particle catalyst having a particle size of 10 μm or larger was 2.0 weight %. Scanning electron microscope observation of this fine particle catalyst confirmed that it was spherical in shape. The platinum base catalyst contained in this fine particle catalyst was about 0.39 weight % as platinum metal.

EXAMPLE 1

100 parts by weight of dimethylvinylsiloxy-capped dimethylpolysiloxane having a viscosity of 10,000 centipoise, 30 parts by weight of fumed silica having a specific surface area of 200 m$^2$/g, 5 parts by weight of hexamethyldisilazane as the surface treatment agent for the silica, and 2 parts by weight of water were mixed uniformly, and further subjected to heated mixing for 2 hours at 170° C. under vacuum. After cooling the base compound obtained, 0.7 part by weight of thermoplastic silicone resin spherical fine particle catalyst prepared in Reference example 2 was added to 100 parts by weight of this base compound and mixed to uniformity to prepare composition 1.

Then, 2.6 parts by weight of trimethylsiloxy-capped dimethylsiloxane-methylhydrogensiloxane copolymer containing 0.7 weight % hydrogen atoms bonded to silicon atoms and 0.01 part by weight of 3-methyl-1-hexyn-3-ol were added to 100 parts by weight of the aforesaid base compound and mixed to uniformity to prepare composition 2.

Composition 1 was loaded in a tank for liquid silicone rubber composition, and similarly, composition 2 was loaded in a separate tank 2. The compositions were sent to a static mixer using a pressure flow pump and mixed in a 1/1 weight ratio to obtain a liquid silicone rubber composition.

Next, nylon 66 resin (product of Toray Industries) was loaded into a thermoplastic resin injection molding machine and melted at a temperature of 230 to about 250° C.

Then, a consecutive injection molding apparatus was set up which comprised a first bottom mobile mold having a concave molding segment, a second bottom mobile mold having the same concave molding segment as the first bottom mobile mold, a first top stationary mold having a path for primary injection material and a gate, and a second top stationary mold having a concave molding segment and a path for secondary injection material and a gate. The two top stationary molds were capable of fitting tightly with the two interchangeable bottom mobile molds. The first top stationary mold was mated with the concave molding segment of the bottom mobile molds to form a partial cavity and the second top stationary mold was to fit with the bottom mobile molds to form a cavity for molding the main body.

Using this apparatus, the aforesaid nylon 66 resin underwent the primary injection into the partial cavity formed by tight fitting of the first top stationary mold and the first bottom mobile mold which were heated to a temperature of 70° C. The injection time was 10 seconds and the solidification time was 30 seconds. Subsequently, the first bottom mobile mold carrying this nylon resin molding was fitted tightly to the second top stationary mold which was heated to a temperature of 110° C., and into the newly formed main body cavity, the liquid silicone rubber composition obtained in the foregoing was injected and cured. The injection time was 10 seconds and the heating time was 30 seconds. The composite obtained was a unified molding of the cured liquid silicone rubber composition and the nylon 66 resin. The interface of the composite was flat, the dimensional precision was excellent, and productivity was high, with no problems even after 200 consecutive moldings. Also, since the static mixer section was not cooled by such means as a chiller, there was no moisture condensation. Furthermore, after the completion of the consecutive moldings, the mixture of the composition 1 and the composition 2 maintained fluidity for more than a week in the mixer at room temperature.

Comparison Example 1

A liquid silicone rubber composition, composition 3, was prepared by the same procedure as described in Example 1, except that 0.02 part by weight of platinum vinylsiloxane complex composition prepared in Reference example 1 instead of the thermoplastic silicone resin spherical fine particle catalyst of Example 1 was added.

The liquid silicone rubber composition was obtained by uniformly mixing the aforesaid composition 3 and the composition 2 prepared in Example 1 in a 1/1 weight ratio as described in Example 1. Using the consecutive injection molding apparatus described in Example 1, consecutive moldings were carried out by the same procedure as described in Example 1 except that the aforesaid composition 3 was used instead of composition 1. After 30 moldings, gelation occurred in the liquid silicone rubber composition and good composite moldings could not be obtained. After completion of the consecutive moldings, the content of the mixer when left at room temperature hardened in 3 hours.

Comparison Example 2

When the liquid silicone rubber composition obtained in Comparison example 1 was cooled to 5° C. and the same consecutive moldings attempted as described in Comparison example 1, no gelation was observed even after 30 moldings. However, the content of the mixer when left at room temperature hardened in 8 hours. Also, moisture condensation occurred around the mixer and it was very messy.

EXAMPLE 2

A liquid silicone rubber composition, composition 4, was prepared by the same procedure as described in Example 1, except that the thermoplastic acrylic resin spherical fine particle catalyst prepared in Reference example 3 was used instead of the thermoplastic silicone resin spherical fine particle catalyst used in Example 1.

The liquid silicone rubber composition was obtained by uniformly mixing the aforesaid composition 4 and the composition 2 as prepared in Example 1 in a weight ratio of 1/1.

ABS resin, product of Toray Industries, trade name TOYOLAC, was loaded into the thermoplastic resin injection molding machine and plasticized in a temperature range of 230 to about 270° C. This resin underwent primary injection into the partial cavity formed by the tight fitting of the first top stationary mold and the first bottom mobile mold of the consecutive injection molding apparatus used in Example 1. The injection time was 10 seconds, the curing time 30 seconds, the injection pressure 400 kg/cm², the mold tightening pressure 10 tons, and the set temperature of the first bottom mobile mold was 80° C. Subsequently, the first mobile mold was opened, and immediately the first bottom mobile mold containing the ABS resin molding was fit tightly to the second top stationary mold which was set at 110° C., and the main body molding cavity was newly formed. The silicone rubber composition obtained in the foregoing was subjected to the secondary injection into this cavity by the same method as described in Example 1. The injection time was 10 seconds, the heating time 35 seconds, the injection pressure 150 kg/cm², and the mold tightening pressure was 15 tons. The composite obtained was a unified molding of the cured liquid silicone rubber composition and ABS resin. Even after 100 consecutive moldings the interface was flat, the dimensional precision was excellent, and no gelation of silicone rubber was observed. Further, after the completion of the consecutive molding, the mixture of the composition 4 and the composition 2 remained fluid for a week in the mixer.

We claim:

1. In a molding method for a composite in which a thermoplastic resin and a liquid silicone rubber composition are injected consecutively into a cavity of a single mold or a single cavity formed by two or more molds, the composite consisting of cured silicone rubber and the thermoplastic resin, where the thermoplastic resin is injected first followed by injection of the liquid silicone rubber which is cured at a temperature greater that 50° C. and lower than the softening point of the thermoplastic resin, the improvement comprising using a liquid silicon rubber composition comprising:

(A) 100 parts by weight of an organopolysiloxane described by average unit formula $R^1_a R^2_b SiO_{(4-a-b)/2}$, where $R^1$ is a monovalent hydrocarbon group which does not contain aliphatic unsaturated linkage, $R^2$ is an alkenyl group, a is a number of 1.90 to about 2.05, b is a number of 0.0005 to about 0.1, and a+b is a number of 1.91 to about 2.06, (B) 1 to about 1,000 parts by weight platinum metal per one million parts of the (A) constituent where the platinum metal is added as a spherical fine particle catalyst comprising a thermoplastic resin having a softening point temperature of 50 to about 150° C. and an average particle size of 0.01 to about 10 µm and a platinum base catalyst providing 0.01 weight percent or greater platinum metal on an elemental basis, (C) an organohydrogenpolysiloxane containing at least 3 hydrogen atoms bonded to silicon atoms in a molecule and the amount of the (C) constituent is such that the ratio of the number of moles of hydrogen atoms bonded to silicon atoms in the (C) constituent and the number of moles of alkenyl groups bonded to silicon atoms in the (A) constituent is 0.5/1 to 20/1, and (D) 0.005 to about 10 parts by weight of a hydrosilylation reaction-inhibiting compound.

2. A method according to claim 1, where the liquid silicone rubber composition is packaged as a two-part system, a Part 1 comprising a portion of the (A) constituent and the (B) constituent and a Part 2 comprising the remainder of the (A) constituent, the (C) constituent, and the (D) constituent.

3. A method according to claim 1, where the (A) constituent is a dimethylvinylsiloxy-capped dimethylpolysiloxane having a viscosity in a range of 10 to about 1,000,000 centipoise at 25° C.

4. A method according to claim 1, where the platinum base catalyst is a complex of chloroplatinic acid and an alkenylsiloxane.

5. A method according to claim 1, where the thermoplastic resin of the (B) constituent is a silicone resin.

6. A method according to claim 1, where the platinum base catalyst of the (B) constituent is a complex of chloroplatinic acid and an alkenylsiloxane and the thermoplastic resin of the (B) constituent is a silicone resin.

7. A method according to claim 1, where the amount of the (B) constituent is in the range of 1 to 100 parts by weight as platinum metal per one million parts of the (A) constituent.

8. A method according to claim 1, where the (C) constituent has a viscosity in the range of 3 to about 10,000 centipoise at 25° C.

9. A method according to claim 1, where the amount of the (C) constituent is such that the ratio of the number of moles of hydrogen atoms bonded to silicon atoms in the (C) constituent to the number of moles of alkenyl groups bonded to silicon atoms in the (A) constituent of 1/1 to 3/1.

10. A method according to claim 1, where the constituent (D) is selected from the group consisting of 2-methyl-3-butyn-2-ol, 2-phenyl-3-butyn-2-ol, 1-ethynyl-1-cyclohexanol, 3-methyl-1-hexyn-3-ol, 1,5-hexadiyne, 1,6-heptadiyne, 1,3-divinyltetramethyldisiloxane, 1,3,5,7-tetravinyltetramethylcyclotetrasiloxane, and 1,3-divinyl-1,3-diphenyldimethyldisiloxane.

11. A method according to claim 1, where the liquid silicone rubber composition further comprises a fumed silica having a hydrophobicized surface.

* * * * *